(12) United States Patent
Yang et al.

(10) Patent No.: US 10,909,233 B2
(45) Date of Patent: Feb. 2, 2021

(54) PAYMENT PASSWORD RESET METHOD AND APPARATUS, AND ELECTRONIC DEVICE

(71) Applicant: ADVANCED NEW TECHNOLOGIES CO., LTD., Grand Cayman (KY)

(72) Inventors: Yipeng Yang, Hangzhou (CN); Kangbei Jiang, Hangzhou (CN); Ning Wang, Hangzhou (CN); Hua Zhao, Hangzhou (CN); Tong Zhu, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/889,548

(22) Filed: Jun. 1, 2020

(65) Prior Publication Data
US 2020/0293647 A1 Sep. 17, 2020

Related U.S. Application Data

(63) Continuation of application No. PCT/CN2019/073554, filed on Jan. 29, 2019.

(30) Foreign Application Priority Data

Mar. 15, 2018 (CN) .......................... 2018 1 0214125

(51) Int. Cl.
*G06F 7/04* (2006.01)
*H04N 7/16* (2011.01)
(Continued)

(52) U.S. Cl.
CPC .......... *G06F 21/45* (2013.01); *G06Q 20/3226* (2013.01); *G06Q 20/401* (2013.01)

(58) Field of Classification Search
CPC .......... G06F 21/45; G06F 21/31; G06F 21/46; G06F 2221/2131; G06F 30/27;
(Continued)

(56) References Cited

U.S. PATENT DOCUMENTS

| 7,552,467 B2 | 6/2009 | Lindsay |
| 7,805,377 B2 | 9/2010 | Felsher |

(Continued)

FOREIGN PATENT DOCUMENTS

| CN | 103235909 B | 8/2013 |
| CN | 104053022 A | 9/2014 |

(Continued)

OTHER PUBLICATIONS

Search Report dated Oct. 25, 2018, issued in related Taiwan Application No. 108100047 (1 page).

(Continued)

*Primary Examiner* — Trong H Nguyen

(57) ABSTRACT

A method includes: training a prediction model with sample data; obtaining user information of a user as an input feature to the prediction model; predicting, using the prediction model according to a set of determination conditions, whether the user has forgotten a payment password associated with a payment application; and in response to predicting that the user has forgotten the payment password and detecting the user logging in the payment application with a login password different from the payment password, displaying a user interface for directing the user to a payment password resetting interface for resetting the payment password.

17 Claims, 4 Drawing Sheets

```
┌─ 202 ─────────────────────────────────────────────────┐
│ Predict, according to a set of determination           │
│ conditions, whether a user has forgotten a             │
│ payment password                                       │
└────────────────────────────────────────────────────────┘
                         │
                         ▼
┌─ 204 ─────────────────────────────────────────────────┐
│ Output, for the user who has been determined to have   │
│ forgotten the payment password and if the user logs    │
│ in, recommendation data for starting a payment         │
│ password resetting process                             │
└────────────────────────────────────────────────────────┘
```

(51) Int. Cl.
*G06F 21/45* (2013.01)
*G06Q 20/32* (2012.01)
*G06Q 20/40* (2012.01)

(58) Field of Classification Search
CPC ............ G06Q 20/3226; G06Q 20/401; H04L 9/3226; H04L 63/083; G06N 3/08; G06N 20/00; G06N 20/10; G06N 20/20; G06T 2207/20081
See application file for complete search history.

(56) References Cited

U.S. PATENT DOCUMENTS

| | | | |
|---|---|---|---|
| 7,908,645 B2 | 3/2011 | Varghese et al. | |
| 7,925,586 B2 | 4/2011 | Cole et al. | |
| 8,027,927 B2 | 9/2011 | Ogg et al. | |
| 8,078,881 B1* | 12/2011 | Liu | G06F 21/31 713/183 |
| 8,175,973 B2 | 5/2012 | Davis et al. | |
| 8,341,078 B2 | 12/2012 | Allin et al. | |
| 8,423,466 B2 | 4/2013 | Lanc | |
| 8,583,493 B2 | 11/2013 | Florek et al. | |
| 8,625,838 B2 | 1/2014 | Song et al. | |
| 8,646,051 B2 | 2/2014 | Paden et al. | |
| 8,850,524 B2 | 9/2014 | Morris et al. | |
| 8,973,113 B1* | 3/2015 | Eatough | G06F 21/45 726/6 |
| 9,098,845 B2 | 8/2015 | Florek et al. | |
| 9,286,604 B2 | 3/2016 | Aabye et al. | |
| 9,355,244 B2 | 5/2016 | Liu et al. | |
| 9,424,413 B2 | 8/2016 | Hammad | |
| 9,922,322 B2 | 3/2018 | Flurscheim et al. | |
| 10,102,510 B2 | 10/2018 | Yau et al. | |
| 2008/0120703 A1* | 5/2008 | Morris | H04L 63/083 726/4 |
| 2010/0281252 A1* | 11/2010 | Steeves | H04L 9/3297 713/155 |
| 2013/0276077 A1* | 10/2013 | Xiong | G06F 21/45 726/6 |
| 2014/0195432 A1 | 7/2014 | Smith, Jr. et al. | |
| 2015/0178493 A1 | 6/2015 | Liu et al. | |
| 2017/0286518 A1 | 10/2017 | Horowitz et al. | |
| 2017/0330168 A1 | 11/2017 | Park et al. | |
| 2017/0337542 A1 | 11/2017 | Kim et al. | |
| 2018/0232722 A1 | 8/2018 | Wong et al. | |

FOREIGN PATENT DOCUMENTS

| | | |
|---|---|---|
| CN | 104102864 A | 10/2014 |
| CN | 104954350 A | 9/2015 |
| CN | 105100022 A | 11/2015 |
| CN | 107358092 A | 11/2017 |
| CN | 108564366 A | 9/2018 |
| TW | 201804389 A | 2/2018 |
| WO | 2015096411 A1 | 7/2015 |

OTHER PUBLICATIONS

PCT International Search Report and the Written Opinion dated Apr. 30, 2019, issued in related International Application No. PCT/CN2019/073554, with partial English translation (10 pages).
First Search dated Jan. 21, 2020, issued in related Chinese Application No. 201810214125.2 (1 page).
First Office Action dated Feb. 6, 2020, issued in related Chinese Application No. 201810214125.2, with English machine translation (13 pages).
Second Office Action dated Mar. 24, 2020, issued in related Chinese Application No. 201810214125.2, with English machine translation (13 pages).
Third Office Action dated May 8, 2020, issued in related Chinese Application No. 201810214125.2, with English machine translation (13 pages).
Fourth Office Action dated Jul. 8, 2020, issued in related Chinese Application No. 201810214125.2, with English machine translation (13 pages).

* cited by examiner

PAYMENT PASSWORD RESET METHOD AND APPARATUS, AND ELECTRONIC DEVICE

CROSS-REFERENCE TO RELATED APPLICATIONS

This application is a continuation application of International Application No. PCT/CN2019/073554, filed on Jan. 29, 2019, which claims priority to and benefit of the Chinese Application No. 201810214125.2, filed on Mar. 15, 2018, all of which are incorporated herein by reference in their entirety.

TECHNICAL FIELD

Embodiments of the specification relate to the technical field of the Internet, and in particular, to a method and an apparatus for resetting a payment password, and an electronic device.

BACKGROUND

Along with the development of smart device technologies, it is increasingly common to see scenarios where an electronic device, such as a mobile phone, is used for instant payment. During payment processing, a user is typically asked to input a payment password. If the user forgets the payment password, the payment processing is interrupted. The user needs to find an entrance on the electronic device for resetting passwords and start a payment password resetting process through the entrance.

SUMMARY

To overcome the problems in the related art, embodiments of the specification provide a method and an apparatus for resetting a payment password, and an electronic device.

According to a first aspect of the specification, a method for resetting a payment password is provided. The method includes: predicting, according to a set of determination conditions, whether a user has forgotten a payment password; and for the user who has been determined to have forgotten the payment password, if the user logs in, outputting recommendation data for starting a payment password resetting process.

In some embodiments, the predicting, according to a set of determination conditions, whether a user has forgotten a payment password includes: obtaining user information of a login user as an input feature to a prediction model, and predicting whether the user has forgotten the payment password with the prediction model.

In some embodiments, the user information includes one or more pieces of the following: identity information, asset information, behavior information on use of the payment password, or management information on the payment password.

In some embodiments, the prediction model is obtained through training using sample data, and the sample data includes user data of any one of the following users: a user whose historical payment behavior satisfies a preset activeness condition and who causes payment failure due to an incorrect or locked payment password; or a user whose historical payment behavior satisfies a preset activeness condition, who does not reset the password within a set time period, and who makes a successful payment.

In some embodiments, the user is a user whose historical payment behavior satisfies a set activeness condition.

In some embodiments, the set determination condition includes any one of the following: a payment failing because a payment password is incorrect or locked, and the payment password having not been reset; a payment password having not been used within a preset time range; and no log-in within a set time range.

In some embodiments, the recommendation data includes an interface for switching to a payment password resetting interface.

According to a second aspect of the specification, an apparatus for resetting a payment password is provided, including: a prediction module configured to predicting, according to a set of determination conditions, whether a user has forgotten a payment password; and an outputting module configured to output, for the user who has been determined to have forgotten the payment password and if the user logs in, recommendation data for starting a payment password resetting process.

In some embodiments, the determining module is configured, for example, to obtain user information of a login user as an input feature to a prediction model, and predict whether the user has forgotten the payment password with the prediction model.

In some embodiments, the user information includes one or more pieces of the following: identity information, asset information, behavior information on use of the payment password, or management information on the payment password.

In some embodiments, the prediction model is obtained through training using sample data, and the sample data includes user data of any one of the following users: a user whose historical payment behavior satisfies a set activeness condition and who causes payment failure due to an incorrect or locked payment password; or a user whose historical payment behavior satisfies a set activeness condition, who does not reset the password within a set time period, and who makes a successful payment.

In some embodiments, the user is a user whose historical payment behavior satisfies a set activeness condition.

In some embodiments, the set determination condition includes any one of the following: a payment failing because a payment password is incorrect or locked, and the payment password having not been reset; a payment password having not been used within a set time range; and no log-in within a set time range.

In some embodiments, the recommendation data includes an interface for switching to a payment password resetting interface.

According to a third aspect of the specification, an apparatus is provided, including: a processor and a memory configured to store instructions executable by the processor. The processor is configured to predict, according to a set of determination conditions, whether a user has forgotten a payment password; and output, for the user who has been determined to have forgotten the payment password and if the user logs in, recommendation data for starting a payment password resetting process.

According to a fourth aspect of the specification, a method for resetting a payment password is provided. The method includes: training, by one or more processors, a prediction model with sample data. The sample data comprises user data of one of the following users: first users having historical payment behaviors indicating a frequency of using payment passwords greater than a threshold and having payment failure due to an incorrect or a locked payment password; and second users having historical payment behaviors indicating a frequency of using payment passwords greater than the threshold, who do not reset their respective payment password within a preset time period, and who made a successful payment with their respective payment password. The method further includes: obtaining, by the one or more processors, user information of a user as an input feature to the prediction model; predicting, by the one or more processors using the prediction model according to a set of determination conditions, whether the user has forgotten a payment password associated with a payment application; and in response to predicting that the user has forgotten the payment password and detecting the user logging in the payment application with a login password different from the payment password, displaying, by the one or more processors, a user interface for directing the user to a payment password resetting interface for resetting the payment password.

In some embodiments, the user information comprises one or more pieces of: identity information, asset information, behavior information of using the payment password, or management information on the payment password.

In some embodiments, the user has historical payment behaviors that satisfy an activeness condition.

In some embodiments, the set of the determination conditions comprises one of the following: a payment failure because of inputting an incorrect payment password or a locked payment password, and the payment password having not been reset since the payment failure; that the user has not used the payment password in a first preset time period; or that the user has not logged in the payment application in a second preset time period.

In some embodiments, the method further includes in response to the user selecting an option to reset the payment password at the user interface, displaying the payment password resetting interface for resetting the payment password.

In some embodiments, the displaying, by the one or more processors, a user interface for directing the user to a payment password resetting interface is performed in response to the user logging in the payment application.

In some embodiments, the method further includes predicting, by the one or more processors, that the user has not forgotten the payment password associated with the payment application when the user uses a biometric feature to authorize payments.

According to a fifth aspect of the specification, an apparatus is provided. The apparatus includes one or more processors and a memory storing instructions executable by the one or more processors to cause the one or more processors to perform operations including: training a prediction model with sample data. The sample data comprises user data of one of the following users: first users having historical payment behaviors indicating a frequency of using payment passwords greater than a threshold and having payment failure due to an incorrect or a locked payment password; and second users having historical payment behaviors indicating a frequency of using payment passwords greater than the threshold, who do not reset their respective payment password within a preset time period, and who made a successful payment with their respective payment password.

The operations further include: obtaining user information of a user as an input feature to the prediction model; predicting, using the prediction model according to a set of determination conditions, whether the user has forgotten a payment password associated with a payment application; and in response to predicting that the user has forgotten the payment password and detecting the user logging in the payment application with a login password different from the payment password, displaying a user interface for directing the user to a payment password resetting interface for resetting the payment password.

According to a sixth aspect of the specification, one or more non-transitory computer-readable storage media are provided. The one or more non-transitory computer-readable storage media are configured with instructions executable by one or more processors to cause the one or more processors to perform operations including: training a prediction model with sample data. The sample data comprises user data of one of the following users: first users having historical payment behaviors indicating a frequency of using payment passwords greater than a threshold and having payment failure due to an incorrect or a locked payment password; and second users having historical payment behaviors indicating a frequency of using payment passwords greater than the threshold, who do not reset their respective payment password within a preset time period, and who made a successful payment with their respective payment password.

The operations further include: obtaining user information of a user as an input feature to the prediction model; predicting, using the prediction model according to a set of determination conditions, whether the user has forgotten a payment password associated with a payment application; and in response to predicting that the user has forgotten the payment password and detecting the user logging in the payment application with a login password different from the payment password, displaying a user interface for directing the user to a payment password resetting interface for resetting the payment password.

The technical solutions according to the embodiments of the specification may achieve the following advantageous effects:

The solution for resetting a payment password according to the specification predicts, according to a set of determination conditions, whether a payment password is forgotten, and for a user who has forgotten the payment password and if the user logs in, can autonomously output, to the user, recommendation data for starting a payment password resetting process.

On the one hand, the solution according to the embodiments can autonomously output, to the user who has forgotten the payment password, recommendation data for starting a payment password resetting process, prompt that the user has forgotten the payment password, and guide the user to reset the payment password in advance, thereby ensuring the smooth performance of subsequent payment processing, preventing the payment from being interrupted, and improving the payment success rate.

On the other hand, since the recommendation data for starting a payment password resetting process has been output to the user, the user is enabled to conveniently start resetting the payment password, which improves the user operation efficiency.

It should be understood that the general description above and detailed description below are merely exemplary and illustrative, which may not be used to limit the specification.

BRIEF DESCRIPTION OF THE DRAWINGS

The accompanying drawings here are incorporated into the specification and form a part of the specification. The accompanying drawings illustrate embodiments that comply

DETAILED DESCRIPTION OF EMBODIMENTS

Example embodiments will be described in detail here, and the examples of the embodiments are illustrated in the accompanying drawings. When the description below involves the accompanying drawings, identical numbers in different drawings represent identical or similar elements, unless otherwise indicated. The implementations described in the following example embodiments do not represent all implementations that are consistent with the specification. Rather, they are merely examples of apparatuses and methods that are consistent with some aspects of the specification as described in detail in the appended claims.

Terms used in the specification are only for the purpose of describing particular embodiments, rather than limiting the specification. "A," "the," and "said" in the singular form used in the specification and the appended claims are intended to include the plural forms as well, unless clearly indicated in the context to have other meanings. It should also be understood that the term "and/or" used herein refers to any or all possible combinations of one or more associated listed items.

It should be understood that terms such as first, second, third, etc. may be used in the specification to describe various information, but the information shall not be limited to these terms. These terms are only used to differentiate information of the same type from another. For example, without departing from the scope of the specification, first information may also be referred to as second information, and similarly, second information may also be referred to as first information. Depending on the context, the term "if" used herein may be construed as "when . . ." or "at the time of . . ." or "in response to determining."

Figure 1:
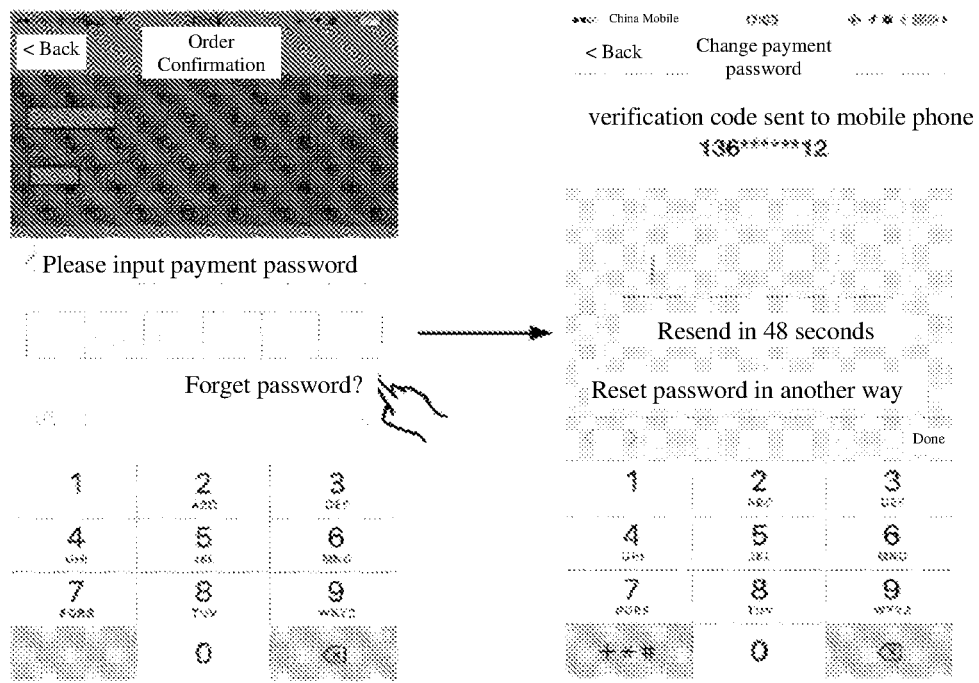
FIG. 1 is a schematic diagram of a payment password resetting scenario.

FIG. 1 is a schematic diagram of a payment password resetting scenario. In FIG. 1, a user holds a smart phone. The user is buying a movie ticket at a movie theater and paying for the movie ticket with the smart phone. During the payment process by the user, the user is asked to input a payment password. If the user forgets the payment password, the payment processing flow is interrupted. The user may use other payment methods, such as by cash. The user may also trigger the interface "Forget Password" in FIG. 1, so as to enter a payment password resetting process and make the payment again after the payment password has been reset.

On the basis of this, the embodiments of the specification provide a solution for resetting a payment password. This solution includes techniques for predicting, according to a set of determination conditions, whether a payment password is forgotten, and for a user who has forgotten the payment password and if the user logs in, can autonomously output, to the user, recommendation data for starting a payment password resetting process.

On the one hand, the solution according to the embodiments can autonomously output/display, to the user who has forgotten the payment password, recommendation data for starting a payment password resetting process, prompt that the user has forgotten the payment password, and guide the user to reset the payment password in advance, thereby ensuring the smooth performance of subsequent payment processing, preventing the payment from being interrupted, and improving the success rate of payments.

On the other hand, since the recommendation data for starting a payment password resetting process has been output to the user, the user is enabled to conveniently start resetting the payment password, which improves the user operation efficiency.

The embodiments of the specification will be described in detail below.

Figure 2A:
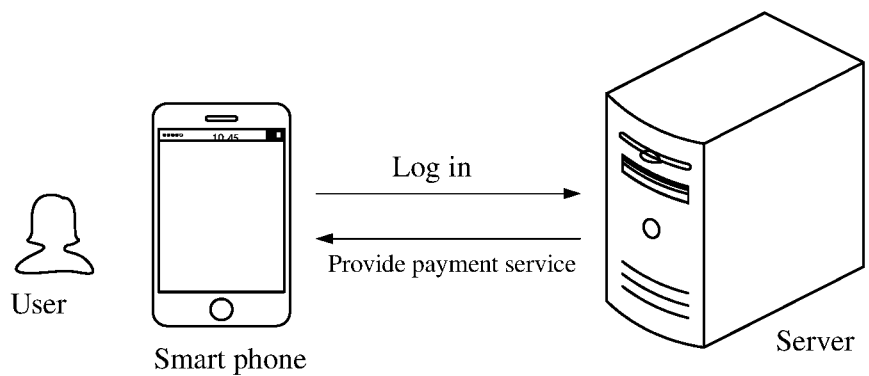
FIG. 2A is a schematic diagram of an application scenario of resetting a payment password according to an example embodiment of the specification.

FIG. 2A is a schematic diagram of an application scenario of payment password resetting according to an example embodiment of the specification. FIG. 2A illustrates a server functioning as a server device and a smart phone functioning as a client device. Here, the client device may also be a Personal Digital Assistant (PDA), a wearable device, or other intelligent devices. The server in FIG. 2A provides payment services to various clients, and a user may install a client (e.g., a payment application) having payment functions on the intelligent device. The user may log in the server via the client to register an account, provide personal information (e.g., user name, mailing address, registration number or identity information, bank card information, and the like), and obtain the payment service provided by the server.

Figure 2B:
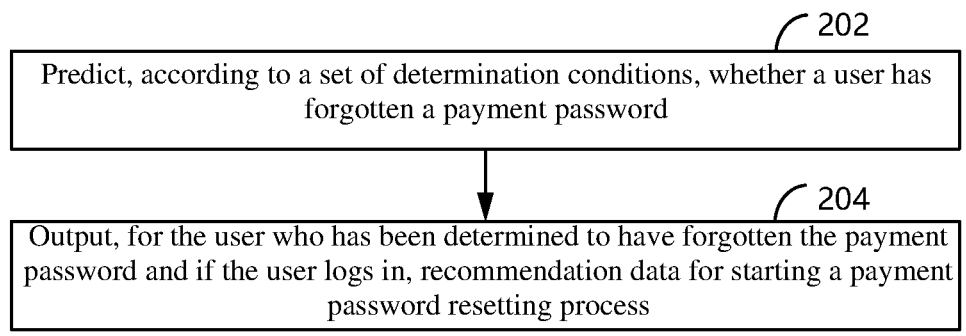
FIG. 2B is a flow chart of a method for resetting a payment password according to an example embodiment of the specification.

FIG. 2B is a flow chart of a method for resetting a payment password according to an example embodiment of the specification. The method includes the following steps.

In Step 202, predict, according to a set of determination conditions, whether a user has forgotten a payment password.

In Step 204, output, for the user who has been determined to have forgotten the payment password and if the user logs in the client, recommendation data for starting a payment password resetting process.

In order to prevent interruption of the payment process due to the user forgetting the payment password during the payment process, whether the user has forgotten a payment password may be predicted according to determination conditions in the embodiments of the specification. For the user who has been determined to have forgotten the payment password according to a result of the determination, if the user logs in, recommendation data for starting a payment password resetting process may be output, and consequently, the user who has forgotten the payment password may be autonomously prompted, and the user is recommended to start the payment password resetting process.

Here, the method according to the embodiments of the specification may be applicable on the server. The server predicts whether the user has forgotten a payment password, and outputs, for the user who has been determined to have forgotten the payment password and if the user logs in, recommendation data for starting a payment password resetting process. The recommendation data may be sent by the server to the client for display, or the server may use, by means of notification, the client to output/display the recommendation data. In some other examples, the method may also be applicable on the client, such that the client makes the determination and outputs the recommendation data. It should be noted that, when a user registers an account at the server, the user typically sets a login password for logging in the account at the server. The payment password in the embodiments of the specification is a password dedicated for confirming whether the user can make a payment during a payment process, which is different from the log-in password.

In some embodiments, the timing for executing outputting the recommendation data is "after the user logs in." In order to prevent interruption of the payment process of the user due to the user forgetting the password, it would be desirable to reset the payment password before the payment process is started. For example, password resetting is executed immediately after it is confirmed that the user has logged in, so as to guide the user to reset the payment password before the user triggers a payment function of the client and starts the payment process. In other examples, the client may provide a variety of functions in addition to the payment function, and it is possible that the user starts the client and logs in the account to use other functions. Therefore, password resetting may also be executed within a preset time period after the user logs in. For example, there may be a variety of choices, such as password resetting being executed within 2 seconds after the user logs in, password resetting being executed within 5 seconds after the user logs in, or the like.

As an example, the recommendation data may include a user interface for directing the user to a payment password resetting interface. In the case where the user has forgotten the payment password and selects an option to reset the payment password at the user interface, the payment password resetting interface may be displayed, to enable the user to conveniently reset the payment password, which improves the user operation efficiency.

Figure 3:
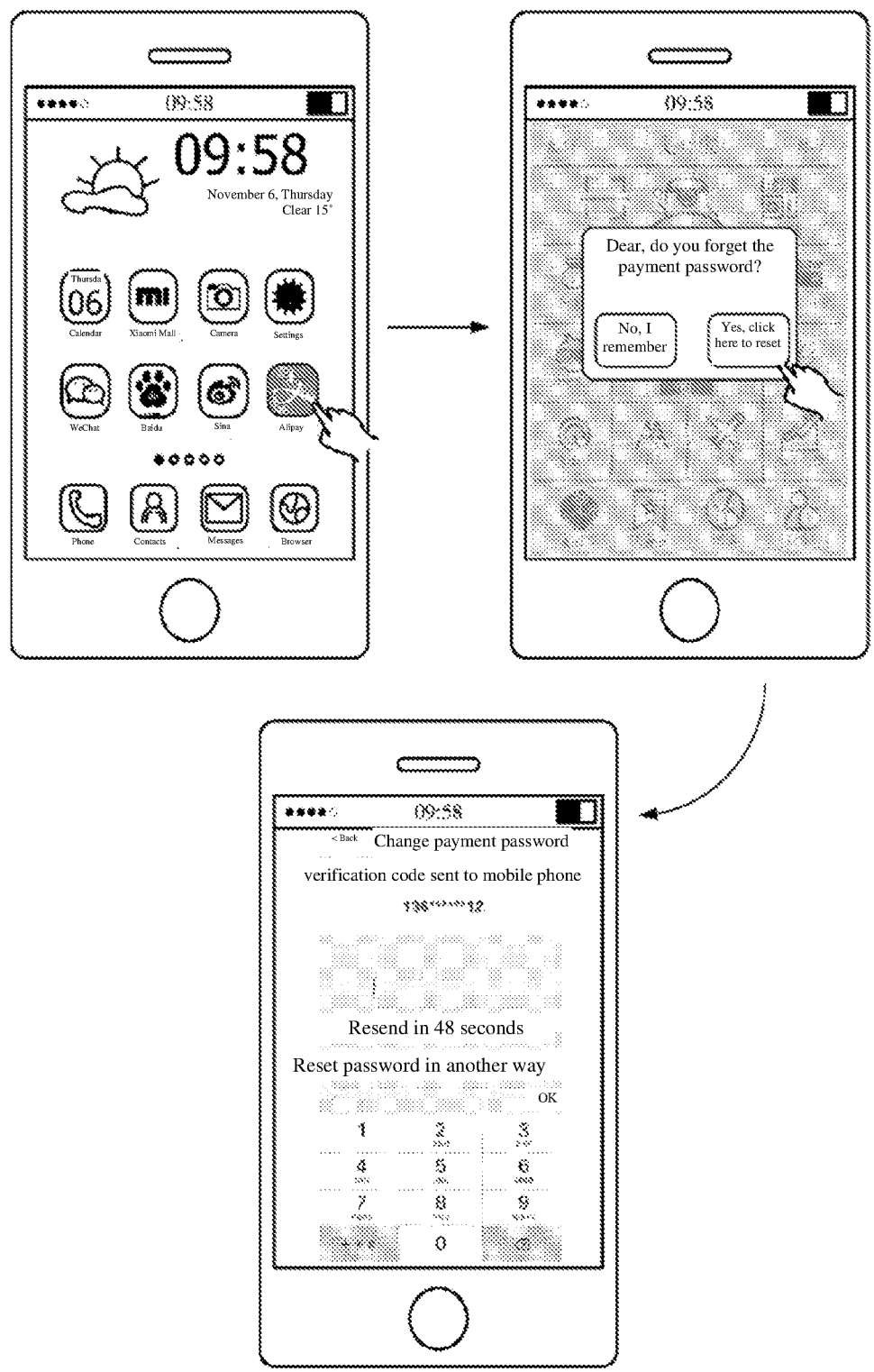
FIG. 3 is a schematic diagram of resetting a payment password according to an example embodiment of the specification.

As an example, FIG. 3 is a schematic diagram of payment password resetting according to an example embodiment of the specification. FIG. 3 illustrates a smart phone functioning as user equipment. The smart phone is installed with a client that provides a payment function. In FIG. 3, the client is represented by "Alipay" as an example. After the user starts the client, the client begins to run, and the user logs in the server via the client. Since the user is determined to be the user who has forgotten the payment password, the server outputs the recommendation data via the client, and the client outputs a user interface for directing the user to a payment password resetting interface. In FIG. 3, the option "Yes, click here to reset" is used as an example of the interface. In example applications, an example display form of this interface may be flexibly configured as needed. By outputting this interface, the client can prompt the user who has forgotten the payment password. With this prompt, the user can select the option to reset the payment password at this interface, and the client may switch to the payment password resetting interface, such that the user may conveniently reset the payment password.

In other examples, the recommendation data may also be interface data of the payment password resetting interface, and then outputting the recommendation data for starting a payment password resetting process may be, for example, outputting the payment password resetting interface in the client. In other words, for the user who has been determined to have forgotten the payment password, the client directly switches to the payment password resetting interface after the user logs in. In some other examples, outputting the recommendation data for starting a payment password resetting process may also be outputting a pop-up, in which components required for resetting a payment password are assembled so that the user may perform an operation of resetting the payment password. In example applications, implementations of outputting the recommendation data may be flexibly configured as needed, which is not limited in the embodiments.

In the embodiments of the specification, a particular condition for predicting whether a login user has forgotten a payment password may be flexibly configured as needed. For example, in example applications, users may have not logged in for a relatively long period, and the possibility that this type of users forget payment passwords is high. Therefore, the determination condition may be as follows: a user having not logged in within a preset time period, where the preset time period may be one month, 50 days, 90 days, or the like. In other examples, in addition to the payment function, the client may provide a variety of services that do not involve payments. It is possible that the user has often logged in the client to use other services, but has not used the payment service. Therefore, the determination condition may be that a payment password has not been used within a time period. Since the user has not used the payment password for a relatively long period, the possibility that the user has forgotten the payment passwords is high, and it may be determined that the user has forgotten the payment password. Alternatively, the determination condition may further include: a payment failure because of inputting an incorrect payment password or a locked payment password, and the payment password having not been reset since the payment failure. Assuming that, after a payment occurs, the user fails to input the correct payment password or causes the payment password to be locked and has not reset the password afterwards. Under the circumstances, the possibility that the user has forgotten the payment passwords is high, and it may be determined that the user has forgotten the payment password. In some other examples, the determination condition may be set in combination with other factors. For example, the payment password has not been used for a relatively long period of time and the user is relatively old, and it can be determined that the user has forgotten the payment password. Alternatively, the payment password has not been used for a relatively long period of time and the user has behaviors of resetting the password for a number of times, and it can be determined that the user has forgotten the payment password. In example applications, the determination rule may be flexibly configured according to a number of factors, such as service needs, application scenarios, and user features.

In an optional implementation, the embodiments of the specification further provide another determination method with high accuracy. For example, the predicting, according to a set of determination conditions, whether a user has forgotten a payment password includes: obtaining user information of a login user as an input feature to a prediction model, and predicting whether the user has forgotten the payment password with the prediction model.

The embodiments of the specification may train a prediction model in advance. In some examples, the prediction model may be trained by a service provider in advance, and the trained prediction model may be stored in user equipment for predicting whether a user has forgotten a payment password. In other examples, the trained prediction model may also be configured to a server for the user equipment to make a determination through the prediction model of the server.

Next, the prediction model will be described. In the embodiments, sample data used for training the prediction model may be prepared in advance. The sample data may include two types of data. First, data of users who have forgotten payment passwords, and second, data of users who have not forgotten payment passwords, such that the prediction model may be trained, with the sample data, to learn what features users who have forgotten payment passwords may have and what features users who have not forgotten payment passwords may have. As a result, in the phase of online application of the model, the prediction model may predict, according to features of a login user, whether the user has forgotten his/her payment password.

It should be understood that the service provider is able to provide one or more services to the user. When registering an account, the user provides some registration information, such as age, gender, employment, or other personal information, and submits the information to the service provider. Service data may be generated in the process of obtaining services. For example, for the payment service provided by the service provider, the user generates corresponding service data in the payment process. In the process of continuously using the service, the user can accumulate a large amount of service data, according to which the service provider can learn some relevant information of the user. For example, the user's payment behaviors may be obtained according to analyses of time of payments made by the user, the number of payments within certain period of time, and the like. For the service provider, when a large amount of various user data is stored in a database, some data may be selected from the user data as the sample data. For example, for users using biometric information (a fingerprint, an iris, or a face) as payment authorization, this type of payment authorization does not require the users to memorize a password, and therefore, service data of this type of users may be excluded as they will not forget the passwords. That is, the user can be classified as having not forgotten the payment password. In other examples, user data of users who have reset passwords may be selected as the sample data. Such user data may include service data generated by a password resetting process, and may also include user data such as personal information of the users. Alternatively, service data generated by active users in the payment process may be selected.

Whether the sample data is appropriate impacts the accuracy of the prediction model to a certain extent. For example, with regard to users who have reset passwords, these users may have reset passwords since they have forgotten the passwords, but may also have reset passwords for other reasons. If such user data is used to train the model, it is possible that an accurate prediction model may not be obtained.

On the basis of this, the sample data in the embodiments of the specification may include user data of any one of the following users.

The first type is users having historical payment behaviors indicating a frequency of using payment passwords greater than a threshold and having payment failure due to an incorrect or a locked payment password.

Some users who have few payment behaviors may exist in a large number of users, and this type of users has accumulated a small amount of payment-related user data. It is difficult for a small amount of user data to accurately depict user features that are related to forgetting passwords for this type of users. Therefore, a user whose historical payment behavior satisfies an activeness condition may be selected as a particular user in the embodiments. The activeness condition refers to a frequency at which the user uses the payment password, for example, once per month, twice per month, or once per three months, which may be flexibly configured in example applications.

On the other hand, since the occurrence of a password resetting behavior may not necessarily be occurred because of forgetting the password, a user who causes payment failure due to an incorrect or locked payment password may also be selected in the embodiments, so as to select users who have truly forgotten passwords. This is because, in the payment process, such a user who has forgotten the password may input an incorrect payment password, and the payment password may even be locked after a number of failed tries. In this case, the operation of the user may generate service data of payment failure. Therefore, it can be determined that this type of service data is generated in the database because the user has forgotten the payment password.

The second type is users having historical payment behaviors indicating a frequency of using payment passwords greater than the threshold, who do not reset their respective payment password within a preset time period, and who made a successful payment with their respective payment password.

In the embodiments, in addition to that a historical payment behavior satisfies an activeness condition, users who truly do not forget passwords also need to be selected. With regard to the selection of this type of users, a user who does not reset the password within a preset time period and who makes a successful payment may be selected. This is because, in the payment process, such users who do not forget passwords will not reset passwords within a set time period and have generated service data of successful payments.

In the above-described manner, users who have forgotten passwords and users who do not forget passwords are selected from a large number of users in the embodiments. Then, user data of these users are obtained as the sample data.

Typically, a certain amount of sample data is needed to ensure the accuracy of a trained model. More sample data may lead to a higher accuracy of the model. On the other hand, after the prediction model has been trained and then placed in application for predicting whether a user has forgotten a password, user data continuously generated by users may be continuously used as new sample data. For example, if it is determined that a user does not forget a password, service data generated after the user makes a successful payment may also be used as sample data, and if it is determined that a user has forgotten a password and the user later resets the payment password, service data of the user may also be used as sample data, thereby achieving continuous training and optimization of the prediction model.

After the above-described sample data is prepared, the prediction model may be obtained by training a machine learning model with the sample data. In the training process, to train a proper model with high accuracy depends on feature selection and model selection. Here, the machine learning model may include a supervised model, a logistic regression model, a random forest model, a Bayesian model, a support vector machine model, a neural network model, or the like. The selection of a model impacts the accuracy of the recognition model ultimately obtained through training. Therefore, a variety of models may be selected in example applications for training, which is not limited in the embodiments of the specification.

In another aspect of the training process, proper features associated with whether a user has forgotten a password need to be selected. The sample data is used for the prediction model to analyze, in multiple aspects, what features of the user are associated with forgetting a password and select what user data as sample data, i.e., determine what features are selected for model training. In an optional implementation, the sample data in the embodiments may include service data generated by the user in the payment process, data formed by personal information of the user, data formed by asset information of the user, attribute data of the payment password used by the user, and the like. Accordingly, one or more pieces of the following user information may be selected as input features to the prediction model: identity information, asset information, behavior information on use of the payment password, or management information on the payment password.

As an example, the identity information may include age, gender, education, employment, user level, or the like, which describes relevant basic features of the user, and these features are associated with the degree of forgetfulness of the user. Therefore, the identity information may serve as features associated with forgetting a password.

The asset information may include funds, revenues from asset management, types of bound bank cards, types of bound bank cards, or the like, which describes asset features of the user. The more the assets, the higher the level of value of the account is to the user, and the lower the possibility of forgetting the password is. Therefore, the asset information may serve as features associated with forgetting a password.

The behavior information on use of the payment password may include a frequency at which the payment password is used, the time of the latest use of the payment password, the time interval between the latest two uses of the payment password, whether the payment password has been changed within a recent time range, the number of historical changes of the payment password, and the like. When the payment password is used more frequently, it is less likely for the user to forget the payment password. Therefore, the behavior information on use of the payment password may serve as features associated with forgetting a password.

The management information on the password may include a length of the password, a combination that forms the password, and the like. In some examples, some service providers may limit that the length of the password may not be shorter than 6 bits, and some service providers may limit that the password needs to be a combination of lowercase and uppercase letters, numbers, and the like. In example applications, a user's device may be installed with some applications for managing passwords. The functions of these applications are for recording and managing passwords for the user. If it is detected that such applications are installed in the user's device, the user may record passwords with such applications. The management information describes the easiness to remember a password. When a payment password is longer and more complex, it is more likely to forget the payment password. Therefore, the management information on the password may serve as features associated with forgetting a password.

In some embodiments, the service provider prepares the sample data, selects the features and models, and then can train the prediction model in advance. After the training is completed, the prediction model may be provided in an electronic device or may also be provided in a server for predicting, when necessary, whether a user has forgotten a payment password. Here, user data of some particular users are selected as the sample data. Users with low activeness are eliminated. Since the prediction model is trained with user data of users who satisfy an activeness condition, the user as an object of determination by the prediction model in the application phase may be a user whose historical payment behavior satisfies an activeness condition, thereby avoiding circumstances in which the prediction model makes incorrect determination on users with few payment activities. As an example, when the prediction model is provided at the server, the server may select users who satisfy an activeness condition according to a set period, and predict whether these users have forgotten payment passwords. According to a result of determination, the server may obtain users who have forgotten payment passwords. After these users who have forgotten payment passwords log in, the server may output recommendation data for starting a payment password resetting process.

Corresponding to the above-described embodiment of the method for resetting a payment password, the specification further provides embodiments of an apparatus for resetting a payment password and an electronic device on which the apparatus is applied.

Figure 4:
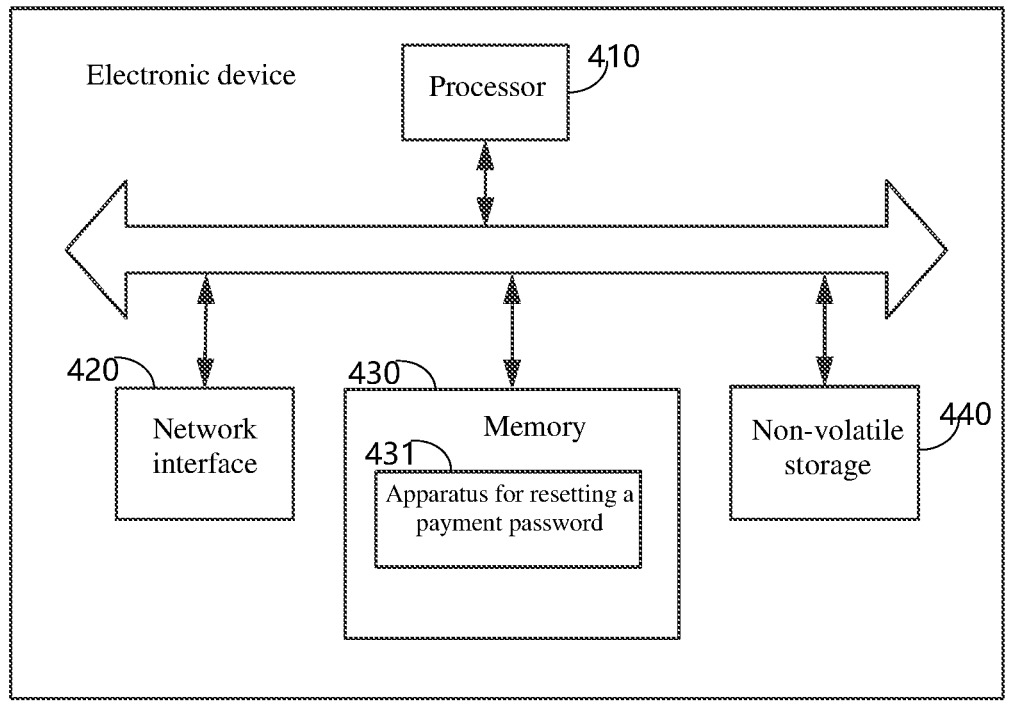
FIG. 4 is a hardware structural diagram of an electronic device for resetting a payment password according to an example embodiment of the specification.

The embodiment of an apparatus for resetting a payment password according to the specification may be applied on an electronic device, such as a smart phone or a server. The apparatus embodiment may be implemented through software, hardware, or a combination of software and hardware. Taking software implementation as an example, a device in the sense of logics is formed by a processor of a file processing where the device is located reading corresponding computer program instructions in a non-volatile storage into a memory for running. From the hardware layer, FIG. 4 is a hardware structural diagram of an electronic device for resetting a payment password according to the specification. In addition to a processor 410, a memory 430, a network interface 420, and a non-volatile storage 440 shown in FIG. 4, the electronic device where the apparatus 431 is located may further include other hardware typically according to actual functions of the electronic device, which will not be elaborated by the specification.

Figure 5:
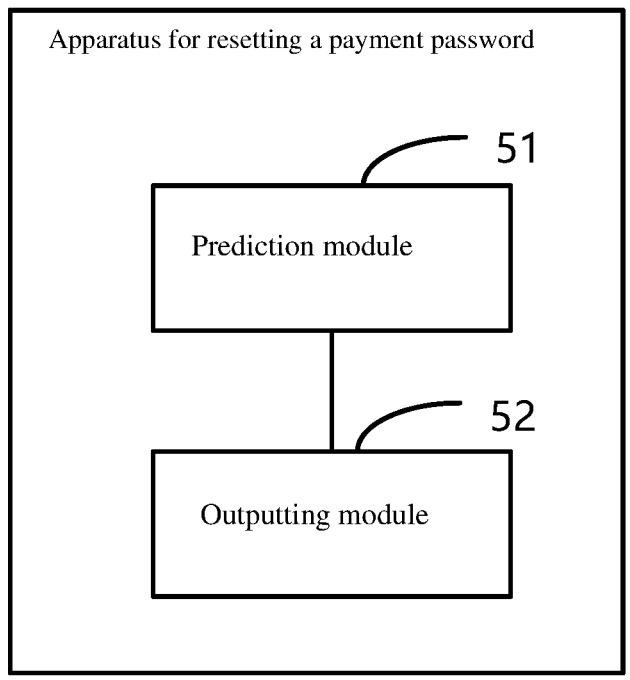
FIG. 5 is a block diagram of an apparatus for resetting a payment password according to an example embodiment of the specification.

As shown in FIG. 5, FIG. 5 is a block diagram of an apparatus for resetting a payment password according to an example embodiment of the specification. The apparatus includes a prediction module 51 and an outputting module 52.

The prediction module 51 is configured to predict, according to a set of determination conditions, whether a user has forgotten a payment password.

The outputting module 52 is configured to output, for the user who has been determined to have forgotten the payment password and if the user logs in, recommendation data for starting a payment password resetting process.

In some embodiments, the prediction module is configured, for example, to obtain user information of a login user as an input feature to a prediction model, and predict whether the user has forgotten the payment password with the prediction model.

In some embodiments, the user information includes one or more pieces of the following: identity information, asset information, behavior information on use of the payment password, or management information on the payment password.

In some embodiments, the prediction model is obtained through training using sample data, and the sample data includes user data of any one of the following users: a user whose historical payment behavior satisfies a set activeness condition and who causes payment failure due to an incorrect or locked payment password; and a user whose historical payment behavior satisfies a set activeness condition, who does not reset the password within a set time period, and who makes a successful payment.

In some embodiments, the user is a user whose historical payment behavior satisfies a set activeness condition.

In some embodiments, the set determination condition includes any one of the following: a payment failing because a payment password is incorrect or locked, and the payment password having not been reset; a payment password having not been used within a set time range; and no log-in within a set time range.

In some embodiments, the recommendation data includes an interface for switching to a payment password resetting interface.

Correspondingly, the specification further provides an electronic device. The electronic device includes a processor; and a memory configured to store instructions executable by the processor, wherein the processor is configured to predict, according to a set of determination conditions, whether a user has forgotten a payment password; and output, for the user who has been determined to have forgotten the payment password and if the user logs in, recommendation data for starting a payment password resetting process.

For detailed implementation processes of functions and roles of the modules in the above-described apparatus for resetting a payment password, the implementation processes of corresponding steps in the above-described method for resetting a payment password may be referenced, which will not be elaborated in the specification.

Since the apparatus embodiment substantially corresponds to the method embodiment, the description of relevant parts of the method embodiment may be referenced for related parts. The above-described apparatus embodiment is merely exemplary, wherein the modules described as separate parts may or may not be physically separated. Parts displayed as modules may or may not be physical modules, i.e., may be located at one place or may be distributed over a plurality of network modules. Some or all of the modules can be selected according to actual needs to achieve the objectives of the solutions of the specification. One of ordinary skill in the art can understand and implement the solutions of the specification without creative effort.

Particular embodiments of the specification are described above, and other embodiments fall within the scope of the appended claims. In some cases, actions or steps set forth in the claims may be executed in an order different from those in the embodiments and can still achieve desired results. In addition, processes depicted in the accompanying drawings may not necessarily require the illustrated particular order or a continuous order to achieve desired results. In some implementations, multi-task processing and parallel processing are also feasible or may be beneficial.

It would be easy for those skilled in the art to conceive, after considering the specification and practicing the invention of the present application, of other implementation solutions of the specification. The specification intends to cover any modifications, uses, or adaptive variations of the specification. These modifications, uses, or adaptive variations comply with the general principles of the specification, and include common general knowledge or conventional technical means in the art that are not claimed in the specification. The specification and embodiments may be only deemed to be exemplary, and the true scope and spirit are pointed out in the claims below.

It should be understood that the specification is not limited to the accurate structure described above and illustrated in the accompanying drawings, and the specification may be subject to various modifications and variations without departing from the scope of the specification. The scope of the specification shall be defined only by the appended claims.

The above-described is only preferred embodiments of the specification and not intended to limit the specification. Any modifications, equivalent substitutions, and improvements made within the spirit and principle of the specification shall fall within the protection scope of the specification.

What is claimed is:

1. A method for resetting a payment password, comprising:
    training, by one or more processors, a prediction model with sample data, wherein the sample data comprises user data of one of the following users:
        (a) first users having historical payment behaviors indicating a frequency of using payment passwords greater than a threshold and having payment failure due to an incorrect or a locked payment password; and
        (b) second users having historical payment behaviors indicating a frequency of using payment passwords greater than the threshold, who do not reset their respective payment passwords within a preset time period, and who made a successful payment with their respective payment passwords;
    obtaining, by the one or more processors, user information of a user as an input feature to the trained prediction model;
    predicting, by the one or more processors using the trained prediction model according to a set of determination conditions, whether the user has forgotten a payment password associated with a payment application; and
    in response to the predicting that the user has forgotten the payment password associated with the payment application and detecting the user logging in the payment application with a login password different from the payment password associated with the payment application, displaying, by the one or more processors, a user interface for directing the user to a payment password resetting interface for resetting the payment password associated with the payment application.

2. The method according to claim 1, wherein the user information comprises one or more pieces of:
    identity information, asset information, behavior information of using the payment password associated with the payment application, or management information on the payment password associated with the payment application.

3. The method according to claim 1, wherein the user has historical payment behaviors that satisfy an activeness condition.

4. The method according to claim 1, wherein the set of the determination conditions comprises one of the following:
    a payment failure because of inputting an incorrect payment password or a locked payment password, and the payment password associated with the payment application having not been reset since the payment failure;
    that the user has not used the payment password associated with the payment application in a first preset time period; or
    that the user has not logged in the payment application in a second preset time period.

5. The method according to claim 1, further comprising:
in response to the user selecting an option to reset the payment password associated with the payment application at the user interface, displaying the payment password resetting interface for resetting the payment password associated with the payment application.

6. The method according to claim 1, further comprising:
predicting, by the one or more processors, that the user has not forgotten the payment password associated with the payment application when the user uses a biometric feature to authorize payments.

7. An apparatus comprising:
one or more processors; and
a memory storing instructions executable by the one or more processors to cause the one or more processors to perform operations comprising:
training a prediction model with sample data, wherein the sample data comprises user data of one of the following users:
 (a) first users having historical payment behaviors indicating a frequency of using payment passwords greater than a threshold and having payment failure due to an incorrect or a locked payment password; and
 (b) second users having historical payment behaviors indicating a frequency of using payment passwords greater than the threshold, who do not reset their respective payment passwords within a preset time period, and who made a successful payment with their respective payment passwords;
obtaining user information of a user as an input feature to the trained prediction model;
predicting, using the trained prediction model according to a set of determination conditions, whether the user has forgotten a payment password associated with a payment application; and
in response to the predicting that the user has forgotten the payment password associated with the payment application and detecting the user logging in the payment application with a login password different from the payment password associated with the payment application, displaying a user interface for directing the user to a payment password resetting interface for resetting the payment password associated with the payment application.

8. The apparatus according to claim 7, wherein the user information comprises one or more pieces of:
identity information, asset information, behavior information of using the payment password associated with the payment application, or management information on the payment password associated with the payment application.

9. The apparatus according to claim 7, wherein the user has historical payment behaviors that satisfy an activeness condition.

10. The apparatus according to claim 7, wherein the set of the determination conditions comprises one of the following:
a payment failure because of inputting an incorrect payment password or a locked payment password, and the payment password associated with the payment application having not been reset since the payment failure;
that the user has not used the payment password associated with the payment application in a first preset time period; or
that the user has not logged in the payment application in a second preset time period.

11. The apparatus according to claim 7, wherein the operations further comprise:
in response to the user selecting an option to reset the payment password associated with the payment application at the user interface, displaying the payment password resetting interface for resetting the payment password associated with the payment application.

12. The apparatus according to claim 7, wherein the operations further comprise:
predicting, by the one or more processors, that the user has not forgotten the payment password associated with the payment application when the user uses a biometric feature to authorize payments.

13. One or more non-transitory computer-readable storage media configured with instructions executable by one or more processors to cause the one or more processors to perform operations comprising:
training a prediction model with sample data, wherein the sample data comprises user data of one of the following users:
 (a) first users having historical payment behaviors indicating a frequency of using payment passwords greater than a threshold and having payment failure due to an incorrect or a locked payment password; and
 (b) second users having historical payment behaviors indicating a frequency of using payment passwords greater than the threshold, who do not reset their respective payment passwords within a preset time period, and who made a successful payment with their respective payment passwords;
obtaining user information of a user as an input feature to the trained prediction model;
predicting, using the trained prediction model according to a set of determination conditions, whether the user has forgotten a payment password associated with a payment application; and
in response to the predicting that the user has forgotten the payment password associated with the payment application and detecting the user logging in the payment application with a login password different from the payment password associated with the payment application, displaying a user interface for directing the user to a payment password resetting interface for resetting the payment password associated with the payment application.

14. The one or more non-transitory computer-readable storage media according to claim 13, wherein the user information comprises one or more pieces of:
identity information, asset information, behavior information of using the payment password associated with the payment application, or management information on the payment password associated with the payment application.

15. The one or more non-transitory computer-readable storage media according to claim 13, wherein the user has historical payment behaviors that satisfy an activeness condition.

16. The one or more non-transitory computer-readable storage media according to claim 13, wherein the set of the determination conditions comprises one of the following:
a payment failure because of inputting an incorrect payment password or a locked payment password, and the payment password associated with the payment application having not been reset since the payment failure;

that the user has not used the payment password associated with the payment application in a first preset time period; or that the user has not logged in the payment application in a second preset time period.

17. The one or more non-transitory computer-readable storage media according to claim 13, wherein the operations further comprise:

predicting, by the one or more processors, that the user has not forgotten the payment password associated with the payment application when the user uses a biometric feature to authorize payments.

* * * * *